UNITED STATES PATENT OFFICE.

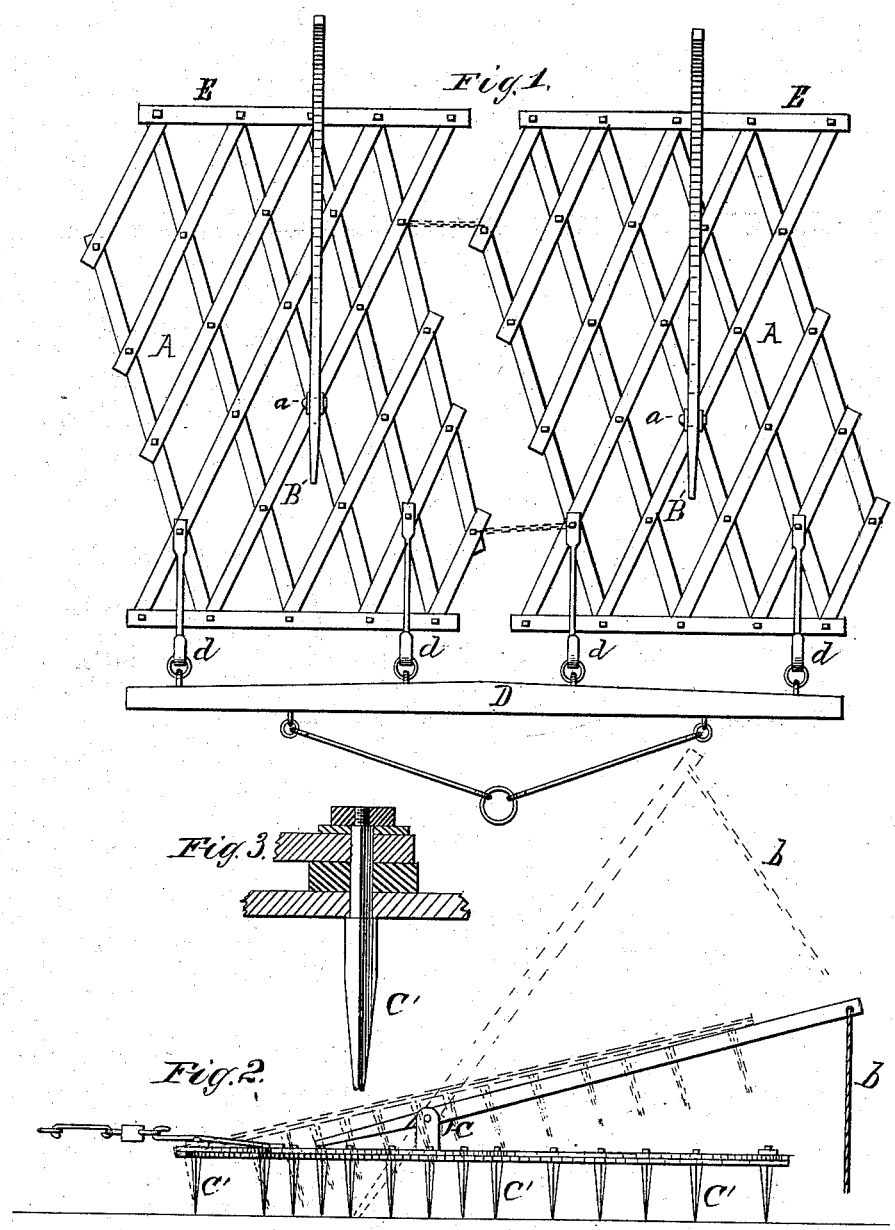

THOMAS MATHIESON, OF ALMADEN, CALIFORNIA.

HARROW.

SPECIFICATION forming part of Letters Patent No. 252,234, dated January 10, 1882.

Application filed November 15, 1881. (No model.)

*To all whom it may concern:*

Be it known that I, THOMAS MATHIESON, residing at Almaden, in the county of Santa Clara and State of California, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a plan view of my improved harrow. Fig. 2 is a side view thereof, showing the harrow in dotted lines in an elevated position; and Fig. 3 is a sectional view taken at a point where one of the teeth passes through it, with the tooth shown in side view.

My invention relates to an improvement in harrows; and it is designed to admit of automatic adjustment thereof to the varying altitudes of the land and occasional temporary elevation of the frame in practice for removal of the trash or stubble collected by the teeth thereof; and it consists in the combination and arrangement of its parts, substantially as hereinafter more fully specified.

I employ, in connection with a harrow, which may be made in two connected together independent sections, A A, a lever, B. The lever B is pivoted between lugs or castings $a$, secured on the upper side, about centrally of a section of the harrow, the shorter arm thereof adapted to work in one of the spaces between the bars of the harrow-section, as will be readily understood by reference to Fig. 1, while the longer arm reaches back a short distance beyond the rear end of the harrow, to permit it to be conveniently manipulated. From the latter end of the lever depends a rope, $b$, or other suitable medium for pulling downwardly upon the lever. The lugs $a$, between which the lever is pivoted, serve as stops in connection with shoulders $c$, formed by reducing preferably the lever at its pivotal point, to limit the elevation of the harrow. The teeth $C'$ of the harrow are secured each in position, as shown in Fig. 3. The harrow-sections A are chained or otherwise connected together, to permit them to vibrate independently of each other while in operation, and to a draft-bar, D, by pivoted bars or links $d\ d$. This bar D is adapted to permit of the hitching of the team thereto, as shown.

The operation is as follows: It being desired to elevate the harrow into the dotted line position of Fig. 2 to permit of the cleaning of the harrow-teeth, the lever B is adjusted so as to cause its shorter arm to rest on the ground, and the continued motion of the harrow drawn by the team will elevate the harrow into the aforesaid position, and by stopping the team it will be sustained in that position by the lever and the holding force of the team. Should the team advance too far, or so as to tend to throw the lever beyond the sustaining-point of the harrow, the lever is arrested by pulling downwardly upon the cord $b$, thus controlling the action of the lever and effecting the adjustment of the harrow in proper position.

I claim and desire to secure by Letters Patent—

The combination, with the harrow A, of the sustaining-lever B, with its forward end capable of resting on the ground and its other end extended to or beyond the rear end of the harrow and having the depending cord $b$ or equivalent medium, substantially as and for the purpose described.

In testimony whereof I affix my signature in presence of two witnesses.

THOMAS MATHIESON.

Witnesses:
J. E. BROWN,
C. C. REDMOND.